United States Patent

[11] 3,601,147

[72] Inventor Edward B. Myers
 Oreland, Pa.
[21] Appl. No. 811,433
[22] Filed Mar. 28, 1969
[45] Patented Aug. 24, 1971
[73] Assignee Honeywell Inc.
 Minneapolis, Minn.

[54] SEMIBALANCED PLUG VALVE
 1 Claim, 3 Drawing Figs.
[52] U.S. Cl. .................................................... 137/484.2,
 251/282
[51] Int. Cl. .................................................. F16k 51/00
[50] Field of Search ............................................ 251/282,
 24; 137/484.2

[56] References Cited
 UNITED STATES PATENTS
 882,170 3/1908 Schmidt ........................ 251/282 X
 3,214,134 10/1965 Noakes .......................... 251/282
 3,298,389 1/1967 Freeman ....................... 251/282 X FOREIGN PATENTS
 809,667 12/1936 France ........................... 251/282
 850,833 9/1952 Germany ....................... 251/282
 723,258 3/1955 Great Britain ................. 251/282

*Primary Examiner*—Arnold Rosenthal
*Attorneys*—Arthur H. Swanson, Lockwood D. Burton and J. Shaw Stevenson ABSTRACT: A semibalanced plug for a double seated cage valve having a bottom end surface thereof provided with a nonspinable inverted frustum-shaped surface, an annular recess formed in this surface and a plurality of the spaced-apart passageways extending from this annular recess to the top of the plug so that a low pressure fluid suction condition will be created along the recess that will effect a pulling action on the fluid from the top to the bottom of the plug into the recess to thereby continuously reduce the pressure of the fluid acting on the top of the plug, the force that is required to move the plug to different operating positions and the size of the actuator that is required.

PATENTED AUG 24 1971

3,601,147

INVENTOR.
EDWARD B. MYERS

BY
John Shaw Stevenson
AGENT.

SEMIBALANCED PLUG VALVE

The present invention relates to a semibalanced valve used for controlling the flow of fluids such as gaseous fluids, steam, water and other fluids that are generally under high pressure.

Since the top surface area of a plug employed in a semibalanced valve on which the fluid pressure passing through the valve is permitted to be applied is greater than the bottom surface area of the plug against which this fluid pressure is applied the opposing forces acting on the top and bottom of the plug cannot be maintained in a desired balanced condition as changes in flow rate of the fluid passing through the valve occurs.

Prior to the present invention it was necessary to make use of a positioner that can apply large forces to the top of the plug and to thereby negate the adverse increase in upward force on the plug that was brought about when an increase in the drop in pressure on either end of the plug occurs due to the aforementioned undesired unbalanced condition of the forces acting on the top and bottom surfaces of the plug.

It is an object of the present invention to therefore provide a unique plug construction for the aforementioned valve that will neutralize the effect of the aforementioned undesired unbalance in the force being applied to the top and bottom of the plug so that the plug will require substantially the same amount of force to move it from one throttling position to another during a condition in which the fluid pressure drop is occurring in the fluids on the affluent and the effluent sides of the valve and which requires a much smaller, lighter weight substantially less expensive actuator to move the plug from one balanced position to another than has heretofore been required.

More specifically it is an object of the present invention to disclose the unique plug of the aforementioned type that is constructed of an inverted frustum shaped configuration at its inner bottom end which has a annular recess formed along its outer periphery and from which recess a series of spaced apart fluid pressure balancing passageways extend to the top of the plug so that a low-pressure area is formed by this recess that will pull the fluid that is under a higher pressure on top of the plug through the passageways in the plug and to the lower side thereof and thereby cause the pressures acting on the top and bottom of the plug to be maintained in a more closely related balanced condition.

It is another object of the present invention to provide the aforementioned vacuum type creating annular recess and fluid pressure balancing passageway construction to enhance the velocity at which fluid can be passed through the valve from one side of the plug to the other.

It is another object of the present invention to eliminate spinning which has heretofore occurred in valve plugs which have employed ribs and other similar constructions on the bottom surfaces of their plugs by employing a nonspinning inverted frustum-shaped construction for these bottom plug surfaces.

It is another object of the present invention to increase the flow efficiency (Cv) of semibalanced type double seated valves by constructing the bottom surface of these valves of the aforementioned inverted frustum configuration.

It is an object of the present invention to provide the aforementioned unique plug construction for improving by approximately 50 percent the present available force balancing capabilities of semibalanced valves that have heretofore been available.

It is another object of the present invention to provide the aforementioned unique plug construction for use in semibalanced valves to prevent unstable plug flutter action that has heretofore existed when other plug constructions have been used with these valves.

It is another object of the present invention to provide the aforementioned plug construction for use in semibalanced valves to prevent the undesired sucking action that has heretofore existed when plug constructions have been used to move the plug to a position that is close to a completely closed position.

A better understanding of the present invention may be had from the following detailed description when read in connection with the accompanying drawings in which.

Figure 1:
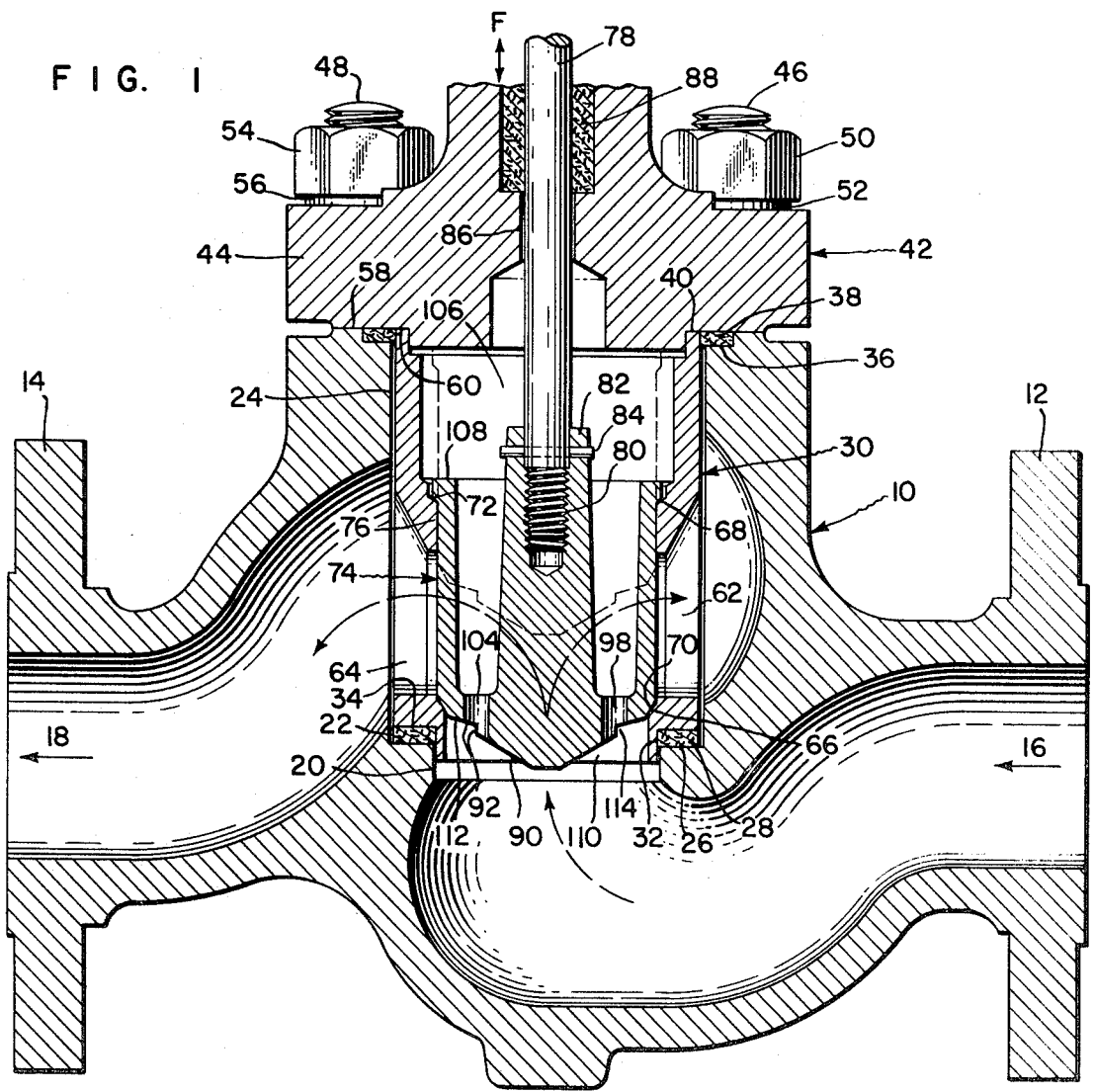
FIG. 1 shows a cross-sectional view of the improved cage valve in both closed solid-line position and its open dotted-line position.
Figure 3:
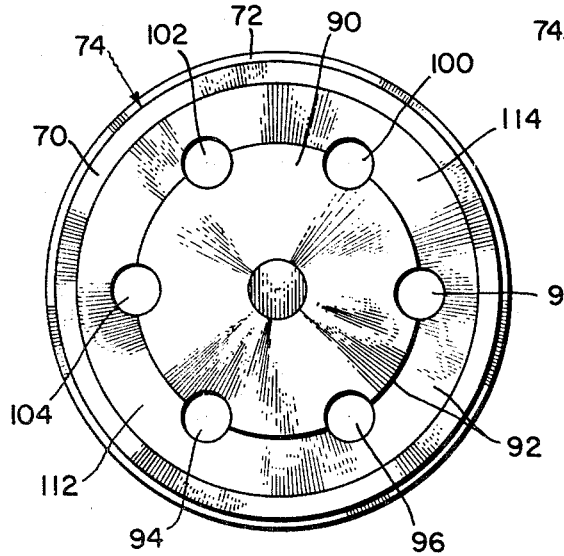
FIG. 3 is a bottom view of the plug shown in FIGS. 1 and 2.

Referring now to the drawing in more detail there is shown in FIG. 1 a unitary valve casing 10 having flanges 12, 14 for mounting the valve between two open ends of a flow conduit through which a fluid under pressure is flowing in the direction of the arrows. The right end portion 16 of the valve casing 10 forms an inlet passageway and its left-end portion 18 forms an outlet passageway. The central portion of this valve 10 has cylindrical wall portions 20, 22, 24.

Between the apertures formed by the wall surfaces 20, 22 there is a flat cylindrical surface 26. A ring-shaped gasket 28 is shown having its outer peripheral surface in sealing engagement with the cylindrical wall surface 22 and its bottom surface in contact with the flat cylindrical wall surface 26.

The lower end of a hollow substantially cylindrically shaped cage member 30 is shown in FIG. 1 in its assembled position.

This cage member 30 is slidably assembled by allowing its lower end to freely pass through the apertured embossed wall surfaces 20, 22, to bring its ring-shaped portion 32 into snug engagement with the inner diametral surface of the gasket 28 and its flat ring-shaped surface 34 into sealing engagement with the top surface of this gasket 28.

FIG. 1 of the drawing also shows the upper end of the valve casing 10 as having a cylindrical apertured wall portion 36 and a ring-shaped gasket 38 inserted therein.

A cylindrical surface 40 of a bonnet 42 is shown retaining the gasket 38 in compressed engagement. The flange portion 44 of the bonnet 42 is made of a square-shaped configuration so that each of the four corner portions of this flange portion 44 can be provided with a connecting means such as the tap bolts 46, 48 whose lower ends can be threadedly connected to the square-shaped valve casing part 10. The tap bolts e.g. 46, 48, which pass through the corner parts of the square-shaped flange 44, are each provided with nut and washer connections, e.g. 50, 52, 54, 56, two of which are shown in FIG. 1.

When these nuts, for example 50, 54, are tightened this threading action will bring the lower surface 40 of the bonnet 42 into tight surface-to-surface engagement with the upper surface 58 of the valve casing 10 and the upper surface 60 of the cage member 30.

It can thus be seen from the aforementioned description that when the nuts, for example 50, 54, are tightened to the position shown in FIG. 1 that the gasket 28 will be readily compressed to a fluid seal position against the surfaces 22 and 26.

It can best be seen in FIG. 1 that the sidewall of the valve casing 30 is provided with a plurality of spaced apart slots 62, 64.

The inner surface of the cage 30 has a pair of spaced apart annular seats 66, 68, formed thereby against which the associated annular seating surfaces 70, 72 of a cylindrical plug 74 are brought into engagement when this plug 74 is moved along the annular guiding surface 76 of the case 30 to any position between its closed solid-line valve position and its open dotted-line position as shown in FIG. 1.

A valve stem 78 is mounted at its lower end by means of a threaded connection 80 to an upper centrally located portion 82 of the plug 74 and retained in fixed position thereon by means of a pin 84.

The upper end of the stem 78 is shown in FIG. 1 passing through a cylindrical wall 86 in the bonnet 42 and in fluid-type slidable engagement with a suitable number of layers of packing 88 to form a fluid seal in the top of the bonnet 42.

Any suitable commercially available actuator, not shown, can be attached to the upper end of the stem 78 to effect the movement of the plug 74 to any position between its fully closed solid-line position and its fully opened dotted-line position.

Figure 2:
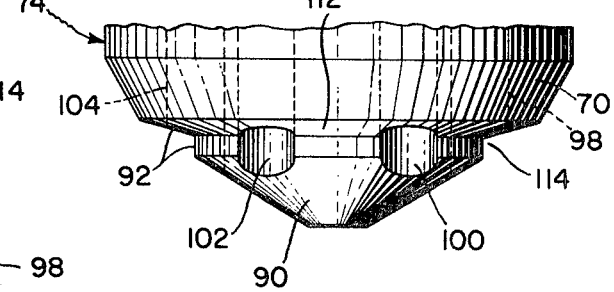
FIG. 2 is a elevational view of a bottom portion of the plug shown in FIG. 1

FIG. 1 and 2 shows that the lower portion 90 of the plug 74 is purposely made of a inverted frustum-shaped configuration to provide a plug 30 which will not be caused to spin by the fluid passing therethrough, as shown by the arrows when it is moved to a partially open or a fully opened position. This inverted frustum-shaped plug construction 90 also enables the valve 10 to provide a higher flow efficiency (Cv) then has heretofore been possible with flat bottom or other shaped plugs because this inverted frustum-shaped surface 90 introduces less turbulence into the fluid flowing through the valve than these other plug constructions and enables a greater beneficial streamlining of this fluid than has heretofore been possible.

A lower inverted frustum-shaped portion 90 of the plug 74 is provided with an annular recess 92 and a series of spaced apart cylindrical passageways 94, 96, 98, 100, 102, 104 extending therefrom to allow passage of the fluid in the chamber 106 on top of the plug 74 that is applying its pressure to the top annular surface 108 of the plug to communicate with the fluid in the cage portion 110 that in turn is applying its pressure to the bottom annular surface 112 of the inverted frustum-shaped portion 90 of the plug 74.

Since the top annular surface 108 of the plug 74 against which the fluid pressure in the top of the plug 74 is applied is of a greater area than the bottom annular surface 112 of the plug on which the fluid passing through this valve is applied it is a normal occurrence with presently available semibalanced valves that a differential pressure is therefore created across the plug in which the fluid pressure acting on the top of the plug is greater than the fluid pressure acting on the bottom of the plug.

When the valve is operating in a partially opened position the annular recess 92 enables an annular low-pressure area to be created at 114 for the fluid as it moves upward parallel to and along the inverted frustum portion 90 of the plug 74 as shown in FIGS. 1 and 2. This lower pressure area 114 thus creates a vacuum which draws fluid in the high-pressure area 106 above the plug 74 down through the cylindrical passageway 94–104 into this annular recess area 114. The aforementioned action therefore reduces the differential pressure that would otherwise be allowed to act on the opposite ends of the plug.

The embodiments of the invention in which an exclusive property or privilege is claimed are defined as follows:

1. In a semibalanced valve, comprising a valve seat, a plug having a tapered bottom surface which is characterized to minimize turbulence in a fluid which is adapted to flow through the valve and thereby to provide a higher flow efficiency, said characterized tapered surface having an annular seating surface extending outwardly therefrom, said plug being operably positioned for rapid movement between a fully opened and fully closed position with respect to said seat to control the flow of the fluid passing through the valve, an annular grooved-out recess formed in a circumferential part of the tapered surface of the plug, spaced apart passageways positioned to pass said fluid from the top of the plug into said recess portion upon the flow of the said fluid over said tapered surface, said annular grooved-out recess being operable to create a vacuum effect on the said fluid that will cause the said fluid in a space above the top of said plug to be rapidly pulled through said passageways to a space below the bottom surface of the plug and a rapid neutralization to take place between the pressures of the fluid acting on the top and bottom surfaces respectively of the semibalanced plug and wherein a first portion of each passageway extends through a part of the annular grooved-out recess and the remaining portion extends through an adjacent portion of the tapered bottom surface of the plug.